(12) United States Patent
Yao et al.

(10) Patent No.: US 12,480,613 B2
(45) Date of Patent: Nov. 25, 2025

(54) INSTALLATION DEVICE FOR SENSOR

(71) Applicant: Aktiebolaget SKF, Gothenburg (SE)

(72) Inventors: Yuanbing Yao, Shanghai (CN); Xing Yi, Shanghai (CN); Minggang Mao, Shanghai (CN); Qin Yao, Nanjing (CN)

(73) Assignee: Aktibolaget SKF, Gothenburg (SE)

( * ) Notice: Subject to any disclaimer, the term of this patent is extended or adjusted under 35 U.S.C. 154(b) by 70 days.

(21) Appl. No.: 18/508,308

(22) Filed: Nov. 14, 2023

(65) Prior Publication Data

US 2024/0167612 A1 May 23, 2024

(30) Foreign Application Priority Data

Nov. 21, 2022 (CN) .......................... 202211461925.7

(51) Int. Cl.
*F16M 11/00* (2006.01)
*F16M 11/04* (2006.01)
*F16M 11/20* (2006.01)
*F16M 13/02* (2006.01)

(52) U.S. Cl.
CPC ....... *F16M 11/045* (2013.01); *F16M 11/2021* (2013.01); *F16M 13/022* (2013.01); *F16M 2200/027* (2013.01)

(58) Field of Classification Search
CPC ............. F16M 11/045; F16M 11/2021; F16M 13/022; F16M 2200/027; G01D 11/30; B60B 27/0068; B23P 19/10; B25B 11/02
See application file for complete search history.

(56) References Cited

U.S. PATENT DOCUMENTS

| | | | | |
|---|---|---|---|---|
| 2,019,789 A | * | 11/1935 | Mahannah | B25B 5/006 224/490 |
| 5,055,865 A | * | 10/1991 | Fujino | G03B 15/05 396/176 |
| 9,206,943 B2 | * | 12/2015 | Chang | A45F 5/00 |
| 11,680,680 B1 | * | 6/2023 | Huang | F16M 11/38 248/276.1 |
| 11,878,399 B1 | * | 1/2024 | Klodd | B25B 5/003 |

* cited by examiner

*Primary Examiner* — Amy J. Sterling
(74) *Attorney, Agent, or Firm* — Stinson LLP

(57) ABSTRACT

The present disclosure provides an installation device for installing a sensor to a component. The installation device includes a first and second clamps connected together for clamping onto the component. A first adjuster is movably assembled to the first and second clamps. A second adjuster is movably assembled to the first adjuster and includes an installing portion for installing the sensor. The first adjuster and the second adjuster can move along different adjusting directions to adjust the direction of the sensor. The sensor installation device has good adaptability and the installing position can be adjusted according to the actual needs. The installation reliability and connection rigidity can be ensured by various ways such as bolt fastening, fastener fixation or adhesion etc., and the vibration signal transmission path is improved. This makes the installation device especially suitable for installation of vibration sensors and ensures vibration sensors optimally collect vibration signals.

34 Claims, 2 Drawing Sheets

INSTALLATION DEVICE FOR SENSOR

CROSS-REFERENCE TO RELATED APPLICATION

This application claims priority to Chinese Application No. 202211461925.7, filed Nov. 21, 2022, the entirety of which is hereby incorporated by reference.

FIELD

The present disclosure relates to an installation device for installing a sensor to a component.

BACKGROUND

Sensors are often used to sense various signals or parameters. However, different sensors have special demands for installation position, for example, vibration sensors need to be rigidly installed on the component to be sensed. In addition, due to the limitation of the environment of some components to be sensed, it is often difficult to install corresponding sensors on the components, which makes it difficult to obtain the relevant parameters of the components.

For example, wheel hubs of modern automobiles are compact and complex in shape, and it is often impossible to effectively install vibration sensors, or even if the sensors are installed, the XYZ directions of the sensors cannot be in line with the XYZ directions of the automobile due to space limit, resulting in poor sensing result. Moreover, due to different shapes and structures of wheel hubs, it is difficult to adapt the conventional vibration sensors to them.

Therefore, the present field desires a sensor installation device with simple structure, easy installation and adjustment, so that even if the installation space is limited, the component can be installed with sensors, and the conventional sensors can be installed to the components with different shapes and structures.

SUMMARY

In view of the problems and desires mentioned above, the present disclosure provides a new technical solution, which solves the above problems and brings other technical effects by adopting the following technical features.

The present disclosure provides an installation device for installing a sensor to a component, comprising: a first clamp and a second clamp, connected with each other and can be clamped onto the component; a first adjuster, movably assembled to the first clamp and the second clamp; a second adjuster, movably assembled to the first adjuster and including an installing portion for installing the sensor; wherein, the first adjuster and the second adjuster can move along different adjusting directions, to adjust the direction of the sensor.

The sensor installation device has good adaptability, and the installing position can be adjusted according to the actual needs. The installation reliability and connection rigidity can be ensured by various ways such as bolt fastening, fastener fixation or adhesion etc., and the vibration signal transmission path is improved, which is especially suitable for the installation of vibration sensors and ensures that the vibration sensors can optimally collect the vibration signals. The installation orientation of the installation device can be set accurately, that is, by adjusting the first and second adjusters, the relevant orientation of the sensor installation device and that of the component can be arranged in line (especially, the XYZ directions of the vibration sensor is in line with the XYZ directions of the automobile chassis).

DETAILED DESCRIPTION

Figure 1:
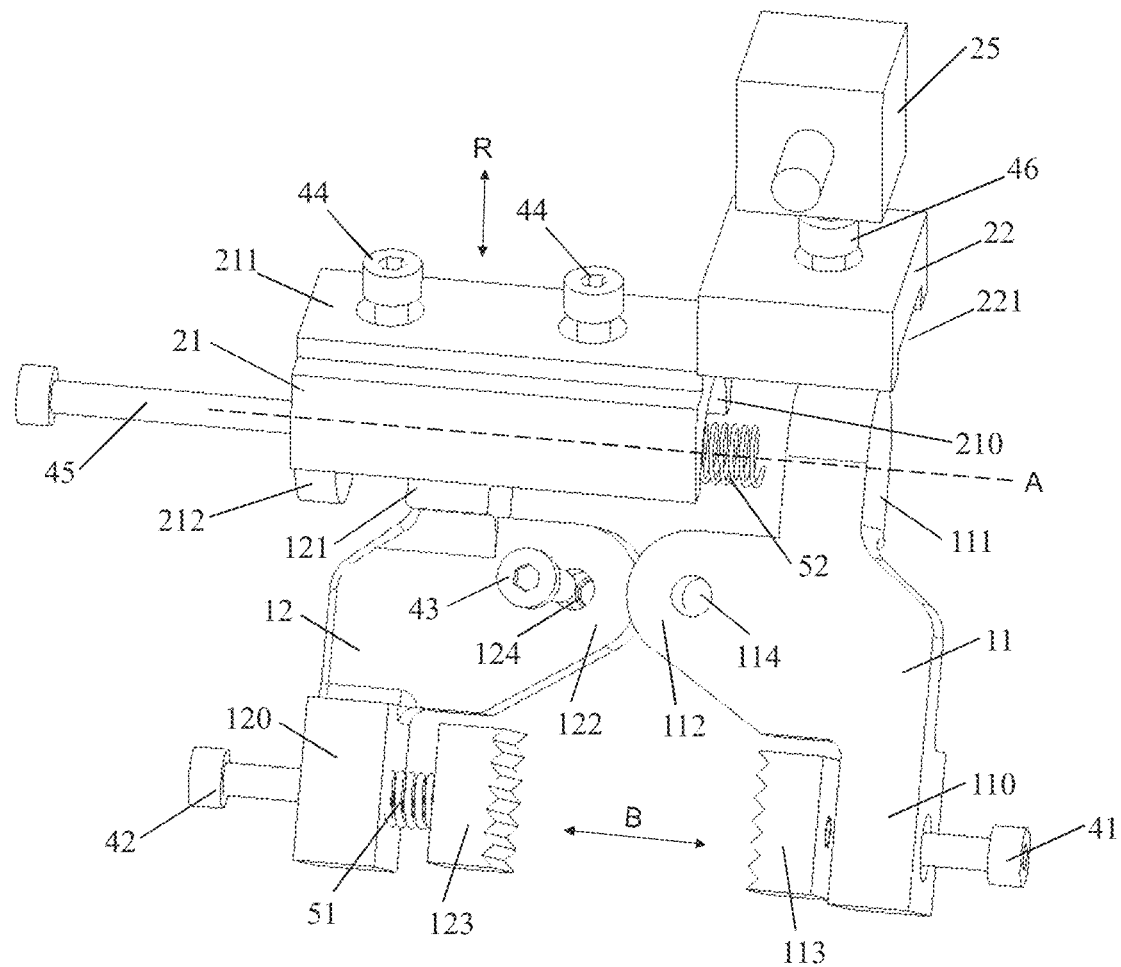
FIG. 1 shows a schematic front view of an installation device according to a preferable embodiment of the present disclosure.

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the present field without creative labor fall into the scope of protection of the present disclosure.

In comparison with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the present field to which this disclosure belongs. The terms "first", "second" and similar terms used in the specification and claims of the patent application of this disclosure do not indicate any order, quantity or importance, but are only used to distinguish different components. When the number of components is not specified, the number of components can be one or more. Similarly, terms such as "a/an", "the" and "said" do not necessarily mean quantity limitation. Similar terms such as "including" or "comprising" mean that the elements or objects appearing before the terms cover the elements or objects listed after the terms and their equivalents, without excluding other elements or objects. Similar terms such as "installation", "setting", "connection" or "matching" are not limited to physical or mechanical installation, setting and connection, but can include electrical installation, setting and connection, whether directly or indirectly. "Up", "down", "left" and "right" are only used to indicate the relative orientation relationship when the equipment is used or the orientation relationship shown in the attached drawings. When the absolute position of the described object changes, the relative orientation relationship may also change accordingly.

Figure 2:
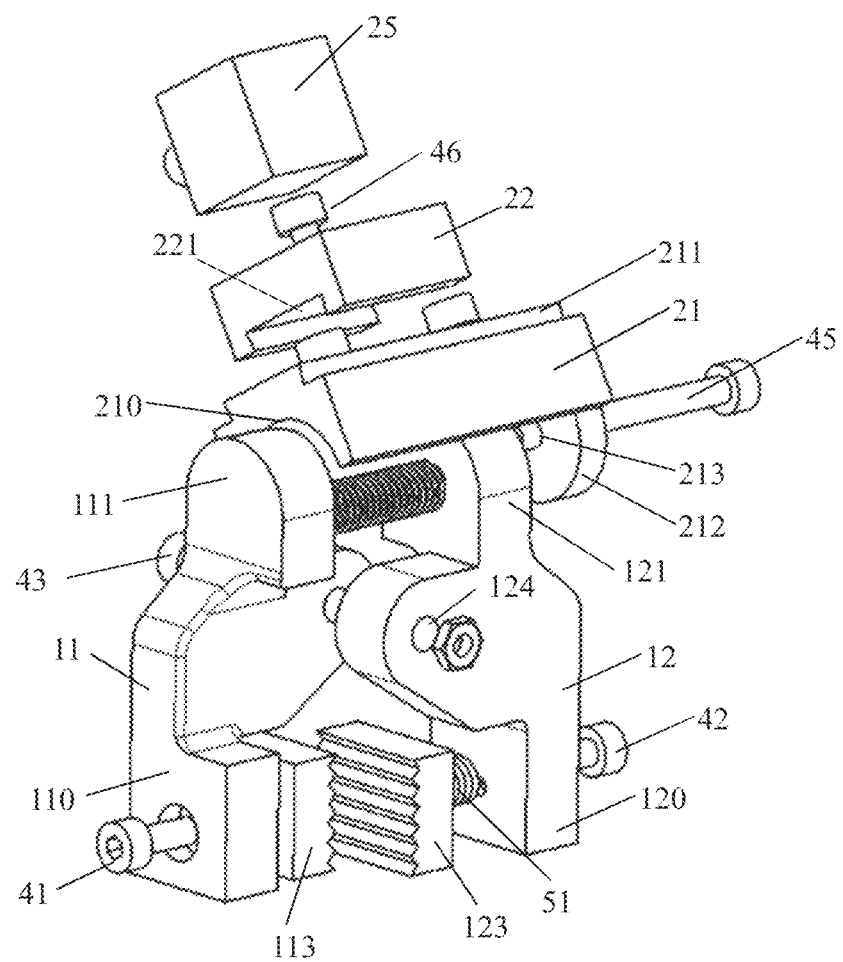
FIG. 2 shows a schematic rear view of an installation device according to a preferable embodiment of the present disclosure.

Referring to FIGS. 1-2, a preferable embodiment of the present disclosure provides an installation device for installing a sensor to a component. This component (which is not shown) may be, for example, a wheel hub or a steering knuckle, etc. of an automobile, which may have an edge or the like for mounting the installation device.

The installation device comprises a first clamp 11 and a second clamp 12, which are connected with each other and can be clamped to the component; a first adjuster 21, movably assembled to the first clamp 11 and the second clamp 12; a second adjuster 22, movably assembled to the first adjuster 21 and including a installing portion for installing a sensor 25 (the sensor 25 may be installed on the second adjuster 22 by, for example, a screw not shown); wherein the first adjuster 21 and the second adjuster 22 can move along different adjusting directions to adjust the orientation of the sensor.

With this installation device, the first and second clamps 11 and 12 can be firmly clamped to a proper position of the component, and further, the orientation of the sensor can be further changed by position adjustment of the first and second adjusters 21 and 22 along their respective adjusting directions. Therefore, the installation device is especially suitable for installing various sensors on components that are usually difficult to be installed with sensors. For example, for a wheel hub or a steering knuckle of an automobile, the shape and structure thereof are complicated and the ambient space is limited, and it is often difficult to install vibration sensors thereon. However, the installation device of the present disclosure can be clamped at any suitable position (such as on an edge with a certain thickness) of a wheel hub or a steering knuckle of an automobile, and the XYZ directions of the vibration sensor will be in line with the XYZ directions of the automobile through the adjustment of the adjusters.

In order to achieve the above functions and purpose of the present disclosure, the clamps and the adjusters can be configured with any suitable structure. Hereinafter, the specific configuration of the installation device according to the preferable embodiment of the present disclosure will be described with reference to the preferable embodiment shown by the figures. It should be understood that after knowing the concept of the present disclosure, structural changes or modifications can be made to each component of the installation device and still fall within the scope of the present disclosure.

As shown in FIG. 1-2, the first clamp 11 may include a first clamping portion 110 at one end thereof, an adjuster installing portion 111 at the other end thereof and a first connecting portion 112 between the two ends. Correspondingly, the second clamp 12 includes a second clamping portion 120 at one end thereof, an adjuster installing portion 121 at the other end thereof and a second connecting portion 122 between the two ends. The first connecting portion 112 of the first clamp 11 and the second connecting portion 122 of the second clamp 22 are connected with each other, for example, detachably or fixedly.

Specifically, the clamping portion 110 and the clamping portion 120 are mainly used for clamping onto the component to be sensed, and thus they may have any suitable shape or structure. For example, the clamping portions 110 and 120 may be designed appropriately according to the specific structure and application environment of the component, as long as they are suitable for clamping. For example, for vibration sensing on a wheel hub or a steering knuckle of an automobile, the clamping portions 110 and 120 may be formed into a roughly square shape with a certain thickness and rigidity, and may guarantee a certain strength and rigidity while clamping, which is suitable for vibration sensors to sense vibration signals. Preferably, the first clamp 11 and the second clamp 12 may also have substantially the same shape, so as to reduce the manufacture cost.

Further preferably, the first clamping portion 110 may further include a first clamping block 113 having a surface for grasping the component, and the surface includes a surface structure for improving the grasping force; similarly, the second clamping portion 120 may also include a second clamping block 123 having a surface for grasping the component, and the surface includes a surface structure for improving the grasping force. The above-mentioned surface structures may be surface structures with large roughness, or surface structures with corrugations, grooves, protrusions and other textures, as long as there suitable for firmly grasping on the surfaces of the component and preventing slippage.

The clamping blocks 113, 123 may be detachably connected with the corresponding clamping portions 110, 120. For example, the first clamping block 113 may be pushed towards the component and rigidly fastened by a bolt 41 passing through the first clamping portion 110, and the second clamping block 123 may be pushed towards the component and rigidly fastened by a bolt 42 passing through the second clamping portion 120. Alternatively, the clamping blocks 113, 123 may be fixedly connected with the corresponding clamping portions 110, 120 (for example, by welding, bonding, or integrally forming). Moreover, the clamping blocks 113 and 123 may be made of suitable materials. For example, for vibration sensing of a wheel hub or a steering knuckle of an automobile, they can be made of high-strength steel materials, so as to bear large clamping force and effectively transmit the vibration.

Further preferably, at least one of the first clamping block 113 and the second clamping block 123 may be magnetic to be attracted onto the component before fixing the installation device to the component. Through this arrangement, after the position to be sensed on the component is selected, the clamping blocks can be conveniently positioned at the position first, and then the installation device can be assembled and fastened.

Further preferably, a spring 51 may be provided between the second clamping block 123 and the second clamping portion 120, to apply pressure onto the second clamping block 123 toward the component, and such pressure facilitates a better clamping onto the component during the application of the installation device. Similarly, although not shown, such a spring may be provided between the first clamping block 113 and the first clamping portion 110.

Further preferably, the first connecting portion 112 may comprise a first through hole 114, and the second connecting portion 122 may comprise a second through hole 124, and the first clamp 11 and the second clamp 12 are fixed to each other by a bolt 43 passing through the first through hole 114 and the second through hole 124. Moreover, at least one of the first through hole 114 and the second through hole 124 may be formed with a width larger than the diameter of the bolt 43 along the clamping direction (as indicated by arrow B), so that the clamping width between the first clamp 11 and the second clamp 12 can be adjusted along the clamping direction. That is to say, the first clamp 11 and the second clamp 12 are not connected with a single-and-fixed positional relationship, but can be adjusted along the clamping direction, so as to adapt to the component which is to be sensed and has different widths.

Further preferably, a spring 52 may be provided between the adjuster installing portion 111 of the first clamp 11 and the adjuster installing portion 121 of the second clamp 12, and the relative angles of the first clamp 11 and the second clamp 12 may be adjusted by adjusting the force of the spring 52, so that the relative position between the two clamps 11 and 12 may be adjusted to adapt to the installation on a wider or narrower installing surfaces of the component.

Further preferably, in order to adapt to the adjustment of the first adjuster 21, the adjuster installing portion 111 of the first clamp 11 and the adjuster installing portion 121 of the second clamp 12 may be formed into arc-shaped lugs, and the first adjuster 21 includes an arc-shaped groove 210 which can be rotatably fitted to the arc-shaped lugs around the first axis A, especially as shown in FIG. 2. Through the cooperation of the arc-shaped lugs and the arc-shaped groove, the first adjuster 21 can change its angle around the first axis A, and then change the orientation of the sensor. Moreover, the range of such rotation adjustment is large, and it is more flexible to be applied to the component which is to be sensed and has various structures and installation space limits.

In addition, based on this concept, in another preferable embodiment which is not shown, the adjuster installing portion of the first clamp 11 and the adjuster installing portion of the second clamp 12 may be formed into arc-shaped grooves, and the first adjuster 21 includes an arc-shaped protrusion that can be rotatably fitted to the arc-shaped grooves around the first axis.

Further preferably, the installation device may further comprise at least one fastening bolt 44, to apply a rigid fastening force between the first adjuster 21 and at least one of the adjuster installing portion 111 of the first clamp 11 and the adjuster installing portion 121 of the second clamp 12 along a radial direction R perpendicular to the first axis A. By providing such a fastening bolt 44 (and preferably two bolts 44), it is possible to firmly and rigidly fasten the first adjuster 21 to the clamps 11, 12 after the angle of the first adjuster 21 is adjusted as described above.

In addition, the first adjuster 21 may include a fastening wall 212 protruding from at least one end thereof and including a hole 213, and the adjuster installing portion 111 of the first clamp 11 and the adjuster installing portion 121 of the second clamp 12 may also include corresponding holes (not shown) respectively, and the first adjuster 21, the first clamp 11 and the second clamp 12 may be rigidly fastened together by bolts 45 passing through these holes. The bolt 45 can pass through the spring 52 as described above.

Further preferably, the first adjuster 21 may include a guide rail 211, and the second adjuster 22 may include a chute 221 slidably assembled on the guide rail 211, so that the second adjuster 22 may be slidably adjusted relative to the first adjuster 21, to further adjust the orientation of the sensor installed on the second adjuster 22. The guide rail 211 preferably extends along the first axis, but it can also extend in different directions according to different installation requirements. The chute 221 may preferably have any suitable shape. In this preferable embodiment, the chute 221 is constructed in the shape of a generally dovetail groove or a V-shaped groove, and accordingly, the guide rail 211 has a matching shape. With this configuration, after the second adjuster 22 is adjusted to a proper position by sliding on the first adjuster 21, the second adjuster 22 can be rigidly fastened to the first adjuster 21 by screwing the bolt 46 (that has passed through the second adjuster 22) toward the first adjuster 21, so as to prevent the second adjuster 22 from loosening during the vibration of the component being sensed. At the same time, this rigid fastening is also particularly suitable for transmitting vibration signals to the vibration sensor.

Based on this concept, in another preferable embodiment not shown, the first adjuster 21 may include a chute which preferably extends along the first axis, and the second adjuster 22 may include a guide rail slidably fitted into the chute.

When applying the installation device according to the present disclosure, the following steps may be adopted: firstly, clamping the clamps 11 and 12 to the component, connecting and fastening the two clamps, then adjusting the orientation of the first adjuster 21 and fastening it, and lastly, adjusting the orientation of the second adjuster 22 and fastening it.

In addition, the "rigid connection" and "rigid fastening" mentioned herein are particularly suitable for the installation of vibration sensors and can transmit vibration signals from the component to be sensed to the vibration sensors through such rigid connection and fastening.

The exemplary implementation of the present disclosure has been described in detail above with reference to the preferable embodiments. However, it can be understood by those skilled in the art that without departing from the concept of the present disclosure, various changes and modifications can be made to the above specific embodiments, and various technical features and structures provided in this disclosure can be combined in various ways without going beyond the protection scope of the present disclosure, which is determined by the appended claims.

What is claimed is:

1. An installation device for installing a sensor to a component, the installation device comprising:
   a first clamp and a second clamp connected with each other, the first and second clamps configured to clamp onto the component;
   a first adjuster movably assembled to the first clamp and the second clamp;
   a second adjuster movably assembled to the first adjuster, the second adjuster including an installing portion for installing the sensor;
   wherein the first adjuster and the second adjuster are moveable along different adjusting directions to adjust the orientation of the sensor, the second adjuster being slideable relative to the first adjuster along the adjusting direction of the second adjuster.

2. The installation device according to claim 1, wherein the first clamp comprises a first clamping portion at one end thereof, an adjuster installing portion at the other end thereof, and a first connecting portion between the two ends, wherein the second clamp comprises a second clamping portion at one end thereof, an adjuster installing portion at the other end thereof, and a second connecting portion between the two ends, and wherein the first connecting portion of the first clamp and the second connecting portion of the second clamp are connected with each other.

3. The installation device according to claim 2, wherein:
   the first clamping portion comprises a first clamping block, the first clamping block has a surface for grasping the component, and the surface comprises a surface structure for improving the grasping force; and
   the second clamping portion comprises a second clamping block, the second clamping block has a surface for grasping the component, and the surface comprises a surface structure for improving the grasping force.

4. The installation device according to claim 3, wherein the first clamping block can be pushed towards the component and rigidly fastened by a bolt passing through the first clamping portion, and the second clamping block can be pushed towards the component and rigidly fastened by a bolt passing through the second clamping portion.

5. The installation device according to claim 3, wherein at least one of the first clamping block and the second clamping block is magnetic, to be attracted onto the component before fixing the installation device to the component.

6. The installation device according to claim 3, wherein the first connecting portion comprises a first through hole, the second connecting portion comprises a second through hole, and the first clamp and the second clamp are fixed to each other by a bolt passing through the first through hole and the second through hole, and
wherein at least one of the first through hole and the second through hole is formed with a width larger than the diameter of the bolt along a clamping direction, so that the clamping width between the first clamp and the second clamp can be adjusted along the clamping direction.

7. The installation device according to claim 3, wherein a spring for applying a pre-tightening force is provided between the adjuster installing portion of the first clamp and the adjuster installing portion of the second clamp.

8. The installation device according to claim 2, wherein:
the adjuster installing portion of the first clamp and the adjuster installing portion of the second clamp are formed into arc-shaped lugs, and the first adjuster includes an arc-shaped groove which can be rotatably fitted to the arc-shaped lugs around a first axis.

9. The installation device according to claim 8, further comprising at least one fastening bolt configured to apply rigid fastening force between the first adjuster and at least one of the adjuster installing portion of the first clamp and the adjuster installing portion of the second clamp along a radial direction perpendicular to the first axis to secure the first adjuster in position relative to said at least one of the adjuster installing portion of the first clamp and the adjuster installing portion of the second clamp.

10. The installation device according to claim 1, wherein:
the first adjuster comprises a guide rail, and the second adjuster comprises a chute slidably assembled on the guide rail; or
the first adjuster includes a chute, and the second adjuster includes a guide rail slidably fitted into the chute.

11. The installation device according to claim 2, wherein the adjuster installing portion of the first clamp and the adjuster installing portion of the second clamp are formed into arc-shaped grooves, and the first adjuster includes an arc-shaped protrusion which can be rotatably fitted to the arc-shaped grooves around a first axis.

12. The installation device according to claim 7, wherein the adjuster installing portion of the first clamp and the adjuster installing portion of the second clamp are formed into arc-shaped lugs, and the first adjuster includes an arc-shaped groove which can be rotatably fitted to the arc-shaped lugs around a first axis.

13. The installation device according to claim 7, wherein the adjuster installing portion of the first clamp and the adjuster installing portion of the second clamp are formed into arc-shaped grooves, and the first adjuster includes an arc-shaped protrusion which can be rotatably fitted to the arc-shaped grooves around a first axis.

14. The installation device according to claim 1, wherein the adjusting direction of the second adjuster is linear.

15. The installation device according to claim 14, wherein the first clamp is moveable toward the second clamp in a clamping direction to clamp onto the component, the linear adjusting direction of the second adjuster being generally parallel to the clamping direction.

16. The installation device according to claim 14, wherein the adjusting direction of the first adjuster is rotation.

17. The installation device according to claim 1, wherein the adjusting direction of the first adjuster is rotation.

18. An installation device for installing a sensor to a component, the installation device comprising:
a first clamp and a second clamp connected with each other, the first and second clamps configured to clamp onto the component, the first and second clamps each include an arc-shaped lug;
a first adjuster movably assembled to the first clamp and the second clamp, the first adjuster having an arc-shaped groove rotatably fitted to the arc-shaped lugs of the first and second clamps around a first axis;
a second adjuster movably assembled to the first adjuster, the second adjuster including an installing portion for installing the sensor;
wherein the first adjuster and the second adjuster are moveable along different adjusting directions to adjust the orientation of the sensor.

19. The installation device according to claim 18, wherein the adjusting direction of the first adjuster is rotation about the first axis.

20. The installation device according to claim 18, further comprising at least one fastening bolt configured to apply rigid fastening force between the first adjuster and at least one of the arc-shaped lug of the first clamp and the arc-shaped lug of the second clamp along a radial direction perpendicular to the first axis to secure the first adjuster in position relative to said at least one of the arc-shaped lug of the first clamp and the arc-shaped lug of the second clamp.

21. The installation device according to claim 18, wherein the adjusting direction of the second adjuster is parallel to the first axis.

22. The installation device according to claim 18, wherein the first clamp is moveable toward the second clamp in a clamping direction to clamp onto the component, the clamping direction being generally parallel to the first axis.

23. An installation device for installing a sensor to a component, the installation device comprising:
a first clamp and a second clamp connected with each other, the first and second clamps configured to clamp onto the component;
a first adjuster movably assembled to the first clamp and the second clamp;
a second adjuster movably assembled to the first adjuster, the second adjuster including an installing portion for installing the sensor;
wherein the first adjuster and the second adjuster are moveable along different adjusting directions to adjust the orientation of the sensor; and
wherein one of the first adjuster or the second adjuster comprises a guide rail and the other of the first adjuster or the second adjuster comprises a chute slidably assembled with the guide rail.

24. The installation device according to claim 23, wherein the chute is configured to slide along the guide rail as the second adjuster moves in the adjusting direction of the second adjuster.

25. The installation device according to claim 23, wherein the guide rail defines the adjusting direction of the second adjuster.

26. The installation device according to claim 25, wherein the guide rail is linear.

27. The installation device according to claim 23, further comprising a bolt configured to secure the second adjuster in position relative to the first adjuster.

28. The installation device according to claim 23, wherein the first adjuster comprises the guide rail and the second adjuster comprises the chute.

29. The installation device according to claim 23, wherein the first adjuster comprises the chute and the second adjuster comprises the guide rail.

30. An installation device for installing a sensor to a component, the installation device comprising:
- a first clamp and a second clamp connected with each other, the first and second clamps configured to clamp onto the component, the first and second clamps each have an arc-shaped groove;
- a first adjuster movably assembled to the first clamp and the second clamp, the first adjuster having an arc-shaped protrusion rotatably fitted to the arch-shaped grooves of the first and second clamps around a first axis;
- a second adjuster movably assembled to the first adjuster, the second adjuster including an installing portion for installing the sensor;
- wherein the first adjuster and the second adjuster are moveable along different adjusting directions to adjust the orientation of the sensor.

31. The installation device according to claim 30, wherein the adjusting direction of the first adjuster is rotation about the first axis.

32. The installation device according to claim 30, further comprising at least one fastening bolt configured to secure the first adjuster in position relative to the first and second clamps.

33. The installation device according to claim 30, wherein the adjusting direction of the second adjuster is parallel to the first axis.

34. The installation device according to claim 30, wherein the first clamp is moveable toward the second clamp in a clamping direction to clamp onto the component, the clamping direction being generally parallel to the first axis.

* * * * *